US009518602B2

(12) United States Patent
Forthaus et al.

(10) Patent No.: US 9,518,602 B2
(45) Date of Patent: Dec. 13, 2016

(54) BALL JOINT

(75) Inventors: Uwe Forthaus, Duesseldorf (DE); Vat Phiaphakdy, Juechen (DE); Lothar Schaumann, Ratingen (DE); Harald Walter, Duisburg (DE); Dagmar Woelki, Hilden (DE)

(73) Assignee: THK RHYTHM AUTOMOTIVE GmbH, Deuesseldorf (DE)

( * ) Notice: Subject to any disclaimer, the term of this patent is extended or adjusted under 35 U.S.C. 154(b) by 377 days.

(21) Appl. No.: 13/522,417

(22) PCT Filed: Jan. 19, 2011

(86) PCT No.: PCT/EP2011/000210
§ 371 (c)(1),
(2), (4) Date: Aug. 20, 2012

(87) PCT Pub. No.: WO2011/088998
PCT Pub. Date: Jul. 28, 2011

(65) Prior Publication Data
US 2012/0301214 A1    Nov. 29, 2012

(30) Foreign Application Priority Data
Jan. 19, 2010   (DE) .................. 10 2010 005 134

(51) Int. Cl.
*F16C 11/06*    (2006.01)
*F16C 11/08*    (2006.01)

(52) U.S. Cl.
CPC .......... *F16C 11/086* (2013.01); *F16C 11/0623* (2013.01); *F16C 11/0638* (2013.01);
(Continued)

(58) Field of Classification Search
CPC ..... B60G 7/005; B60G 2204/416; B62D 7/16; B62D 7/163; B62D 7/166; F16C 11/0619; F16C 11/0623; F16C 11/0628; F16C 11/0633; F16C 11/0638; F16C 11/0642; F16C 11/0647; F16C 11/0652; F16C 11/0657; F16C 11/0685; F16C 11/08; F16C 11/083; F16C 11/086
(Continued)

(56) References Cited

U.S. PATENT DOCUMENTS 3,650,552 A   3/1972 Schmid
3,945,739 A   3/1976 Abe
(Continued)

FOREIGN PATENT DOCUMENTS

CN    101627216 A   1/2010
DE    1916579 B2   10/1970
(Continued)

OTHER PUBLICATIONS

Translation of DE 10 2007 001 933. Schaumann, Lothar. Ball Joint. Jul. 17, 2008.*
(Continued)

*Primary Examiner* — Josh Skroupa
(74) *Attorney, Agent, or Firm* — Westerman, Hattori, Daniels & Adrian, LLP

(57) ABSTRACT

A ball joint which comprises a joint housing, a bearing shell received in the joint housing, and a ball stud having a ball head arranged for pivoting movement in the bearing shell. The ball head is prestressed by a spring system substantially in the direction of a longitudinal axis of the ball stud against the joint housing. The spring system is composed of spring elements connected in parallel and/or in series, at least one spring element of the spring system being made of a polymer material or of an elastomer material.

19 Claims, 16 Drawing Sheets

(52) U.S. Cl.
CPC ... *F16C 11/0647* (2013.01); *Y10T 403/32713* (2015.01); *Y10T 403/32721* (2015.01); *Y10T 403/32729* (2015.01); *Y10T 403/32737* (2015.01); *Y10T 403/32811* (2015.01)

(58) Field of Classification Search
USPC ............... 403/122, 132–135, 138, 143, 144, 129, 403/137, 141
See application file for complete search history.

(56) References Cited

U.S. PATENT DOCUMENTS

| | | | | |
|---|---|---|---|---|
| 4,231,673 | A | * | 11/1980 | Satoh ................. F16C 11/0633 403/135 |
| 4,995,755 | A | | 2/1991 | Hyodo et al. |
| 5,022,779 | A | | 6/1991 | Schnitzler |
| 5,154,530 | A | * | 10/1992 | Dresselhouse ................ 403/138 |
| 5,188,477 | A | * | 2/1993 | Idosako et al. .............. 403/133 |
| 5,551,791 | A | | 9/1996 | Schneider |
| 5,697,723 | A | | 12/1997 | Wood |
| 6,010,271 | A | * | 1/2000 | Jackson et al. .............. 403/132 |
| 6,113,302 | A | * | 9/2000 | Buhl ............................ 403/133 |
| 6,341,915 | B1 | * | 1/2002 | Kammel ............ F16C 11/0633 403/135 |
| 6,533,491 | B1 | * | 3/2003 | Redele .......................... 403/138 |
| 6,773,196 | B2 | * | 8/2004 | Broker ............... F16C 11/0633 403/135 |
| 7,048,461 | B2 | * | 5/2006 | Williams ..................... 403/135 |
| 7,644,500 | B2 | * | 1/2010 | Schmidt et al. ............. 403/135 |
| 7,753,611 | B2 | * | 7/2010 | Ergodan ...................... 403/138 |
| 8,151,464 | B2 | * | 4/2012 | Orend .......................... 403/132 |
| 8,734,044 | B2 | | 5/2014 | Schaumann |
| 2004/0146338 | A1 | | 7/2004 | Broker et al. |
| 2008/0279618 | A1 | * | 11/2008 | Erdogan ................. B62D 7/166 403/138 |
| 2009/0010706 | A1 | | 1/2009 | Shimazu et al. |
| 2010/0092235 | A1 | | 4/2010 | Schaumann |

FOREIGN PATENT DOCUMENTS

| | | | |
|---|---|---|---|
| DE | 1678052 A1 | 3/1971 | |
| DE | 2326018 A1 * | 8/1974 | .......... F16C 11/0638 |
| DE | 2451084 A1 * | 5/1975 | .......... F16C 11/0638 |
| DE | 2456571 A1 | 6/1975 | |
| DE | 2441916 A1 | 3/1976 | |
| DE | 69621211 T2 | 1/2003 | |
| DE | 102007001933 A1 | 7/2008 | |
| DE | 102007044668 A1 | 4/2009 | |
| EP | 0348642 A1 | 5/1989 | |
| EP | 0343881 A1 | 11/1989 | |
| EP | 0675296 A1 * | 10/1995 | .......... F16C 11/0638 |
| JP | 10318247 A | 12/1998 | |

OTHER PUBLICATIONS

Translation of JP 10-318247. Nemoto, Akira. Ball Joint. Dec. 2, 1998.*
State Intellectual Property Office of the People's Republic of China, Notification of the First Office Action and Search Report issued by the Chinese Patent Office; Application No. 201180006456.3 dated Apr. 1, 2014.
Translation of the International Preliminary Report on Patentability Written Opinion and Search Report, Application No. PCT/EP2011/000210 filed Jan. 19, 2011, dated Aug. 7, 2012.
German Search Report for case No. 10 2010 005 134.9-12 dated Jan. 4, 2011.
European Patent Office Official Action, Application No. DE 11701619.6, dated Nov. 21, 2013.

* cited by examiner

BALL JOINT

CROSS-REFERENCE TO RELATED APPLICATIONS

This application is a national stage of International Application No. PCT/EP2011/000210 filed Jan. 19, 2011, the disclosures of which are incorporated herein by reference in entirety, and which claimed priority to German Patent Application No. DE 10 2010 005 134.9 filed Jan. 19, 2010, the disclosures of which are incorporated herein by reference in entirety.

BACKGROUND OF THE INVENTION

The invention relates to a ball joint having a joint housing, a bearing shell received in the joint housing, and a ball stud having a ball head arranged for pivoting movement in the bearing shell.

Ball joints are used in various forms, for example for vehicles. For such ball joints it is known to receive a bearing shell in the joint housing, a ball head of a ball stud being arranged in an articulated manner in the bearing shell. The bearing shell is in most cases made of a plastic material which results in favorable sliding or friction coefficients between the ball head and the bearing shell and at the same time in favorable manufacturing costs. The wear occurring over the lifetime of the ball joint is compensated by an axial prestress applied to the ball head substantially in the direction of a longitudinal axis of the ball stud. A free play in the joint can be avoided by such a prestress.

The prior art shows various technologies to cause the ball head of a ball joint to be prestressed with respect to the housing.

U.S. Pat. No. 5,188,477 shows an axial ball joint open on one side in which an elastomer element is arranged between a bottom face in the interior of the housing and the bearing shell. Here, the bearing shell is received in the housing such that the elastomer element is pressurized. The elastomer element thus exerts an axial force on the bearing shell so that the ball head arranged within the bearing shell is substantially prestressed in a direction of the longitudinal axis of the ball stud.

Documents U.S. Pat. No. 3,226,142 and U.S. Pat. No. 4,225,260 each show a radial ball joint in which an elastomer ring is placed between a housing cover which closes an opening of the joint housing and an edge-side shoulder section of the bearing shell. In the assembled state of the joint, this elastomer ring tensions the bearing shell in the axial direction so that the ball head is thereby prestressed substantially in the direction of a longitudinal axis of the ball stud. As already explained, such a prestress counteracts the wear over the lifetime of the joint and prevents the occurrence of a free play or similar.

In ball joints of a different type, it is known to cause the bearing shell to be prestressed with respect to the housing cover using a metal spiral spring. This is disclosed for example in EP 348 642, U.S. Pat. No. 924,029 or DE 1 678 052. The spiral spring rests against the housing cover and presses the bearing shell or the upper shell of the bearing means against the ball head. Here, the prestress of the spiral spring defines the pressure force of the bearing shell on the ball head and simultaneously determines the operating characteristic values of the ball joint. Due to the prestress of the bearing shell, a wear within the ball joint can at the same time be compensated.

Furthermore, a ball joint 110 is known from the prior art (see FIG. 25), in which a spring system in the form of a disk spring 128 is provided between the housing cover 124 and the bearing shell 114 in the assembled state of the joint. Due to the prestress of this disk spring 128, the bearing shell 114 is pressed against the ball head 118 of the ball stud 116 such that even if a wear of the bearing shell 114 occurs, a permanent contact between the bearing shell 114 and the ball head 118 is present and no free play occurs between the ball head 118 and the bearing shell 114. The disk spring 128 is to be understood as a series connection of spring elements and ensures a predetermined desired spring characteristic. The drawback of this known joint is the comparatively high space requirement of the disk spring and the high material costs thereof.

BRIEF SUMMARY OF THE INVENTION

A feature of the invention is to provide a ball joint in which a prestressing of the ball head with respect to the housing is obtained with simple and in particular space-saving means.

According to the invention, this feature is achieved by a ball joint comprising a joint housing, a bearing shell received in the joint housing, a ball stud having a ball head arranged for pivoting movement in the bearing shell, the ball head being prestressed by a spring system substantially in the direction of a longitudinal axis of the ball stud against the joint housing, wherein the spring system is composed of spring elements connected in parallel and/or in series, at least one spring element of the spring system being made of a polymer material or of an elastomer material. Advantageous further developments of the invention are defined in the dependent claims.

An essential aspect of the invention is based on the findings that the spring system by means of which the ball head is prestressed is composed of a plurality of spring elements which are connected in parallel and/or in series, at least one spring element of this spring system being made of a polymer material or of an elastomer material. Depending on the demand of a respective case of application of the ball joint, the required resulting characteristic of the spring system can be precisely adjusted by an appropriate connection of the spring elements, whether in series and/or in parallel. The resulting characteristic can be linear, multilinear or nonlinear. The resulting characteristic of the spring system is in particular important in case the ball joint is subject to an external load, e.g. in the axial direction or in the direction of a longitudinal axis of the ball stud. By choosing a polymer material or an elastomer material for at least one spring element of the spring system, it is furthermore possible to obtain an inexpensive and particularly space-saving configuration of the spring system.

For practical purposes, the bearing shell is made of a plastic or a polymer material. This leads to advantageous friction coefficients between the bearing shell and the ball head. Due to the prestress exerted by the spring system on the ball head substantially in the direction of a longitudinal axis of the ball stud, an adjusting action in case of settling effects of the plastic bearing shell, which can occur during loading or ageing, is furthermore obtained. Consequently, the appearance of a free play over the lifetime of the ball joint is reliably prevented, even if the ball joint is subject to high loads in the direction of the longitudinal axis of the ball stud.

With regard to the connection of the plurality of spring elements of the spring system, it must be understood that these spring elements are preferably connected in series in the assembled ball joint. The configuration of the spring elements involved in the spring system can be chosen such that a parallel connection of the spring elements overlapping with the series connection of the spring elements is then additionally generated when a loading condition arises. In this way, an overstressing or a damage of the spring system can be avoided. Alternatively, it is also possible that the spring elements forming the spring system are already connected both in series and in parallel when the ball joint is mounted.

In an advantageous further development of the invention, if a spring element of the spring system is made of a polymer material or of an elastomer material, this spring element can be formed integrally with the bearing shell. Alternatively, this spring element may also be part of the bearing shell and is preferably formed from the pole region of the bearing shell. This integration of the at least one spring element into the component of the bearing shell results in advantageous space and cost savings.

In an advantageous further development of the invention, a further spring element of the spring system can be manufactured separately from the bearing shell, this spring element being arranged on the bearing shell in the assembled state of the joint. Here, this further spring element contacts both the bearing shell and the housing or a housing cover by means of which an opening of the housing is closed. Alternatively, this further spring element may also directly be formed integrally with the bearing shell, preferably by a two-component injection molding. A direct integral molding of the further spring element with the bearing shell has the advantage that an erroneous mounting of the further spring element during the manufacture of the ball joint is excluded.

In an advantageous further development of the invention, the further spring element which is arranged on the bearing shell or is formed integrally therewith may be made of an elastomer material. An elastomer material generally has a different rigidity than a polymer material or a metal and is suited for adjusting in particular progressive spring characteristics. It is advantageous if the further spring element which is made of an elastomer material is received in a cavity formed between the bearing shell on one side and the housing or the housing cover on the other side. In the assembled state of the joint, the majority of this cavity can be filled by the elastomer spring element. As from a determined axial loading of the ball joint, the elastomer spring element substantially fills the cavity so that this results in a progressive slope of the spring characteristic of the spring system.

In an advantageous further development of the invention, the elastomer spring element can be adapted to the cavity between the bearing shell and the housing or the housing cover by means of its cross-section. This has the advantage that in case of an axial loading of the ball joint, the cavity is purposefully filled by the elastomer spring element to ensure the desired progressive shape of the spring characteristic of the spring system. The elastomer spring element can have appropriate recesses on an inner face of the housing or of the housing cover adjacent to body joints or similar, so that no damages of the elastomer spring element occur when the cavity is filled by the latter.

In an advantageous further development of the invention, a closure element can be fastened in the joint housing, by means of which the bearing shell is captively held within the joint housing. The closure cover may be configured in the form of a closure ring or in form of a closure cover. In an embodiment of this type, the closure element may simultaneously fulfill the function of a spring element and be part of a spring system by means of which the ball head is prestressed against the joint housing.

It is obvious that the features mentioned above and the features that are still to be explained below can be used not only in the respective specified combination but also in other combinations or alone without leaving the scope of the present invention.

Other advantages of this invention will become apparent to those skilled in the art from the following detailed description of the preferred embodiments, when read in light of the accompanying drawings.

DETAILED DESCRIPTION OF THE INVENTION

Figure 1:
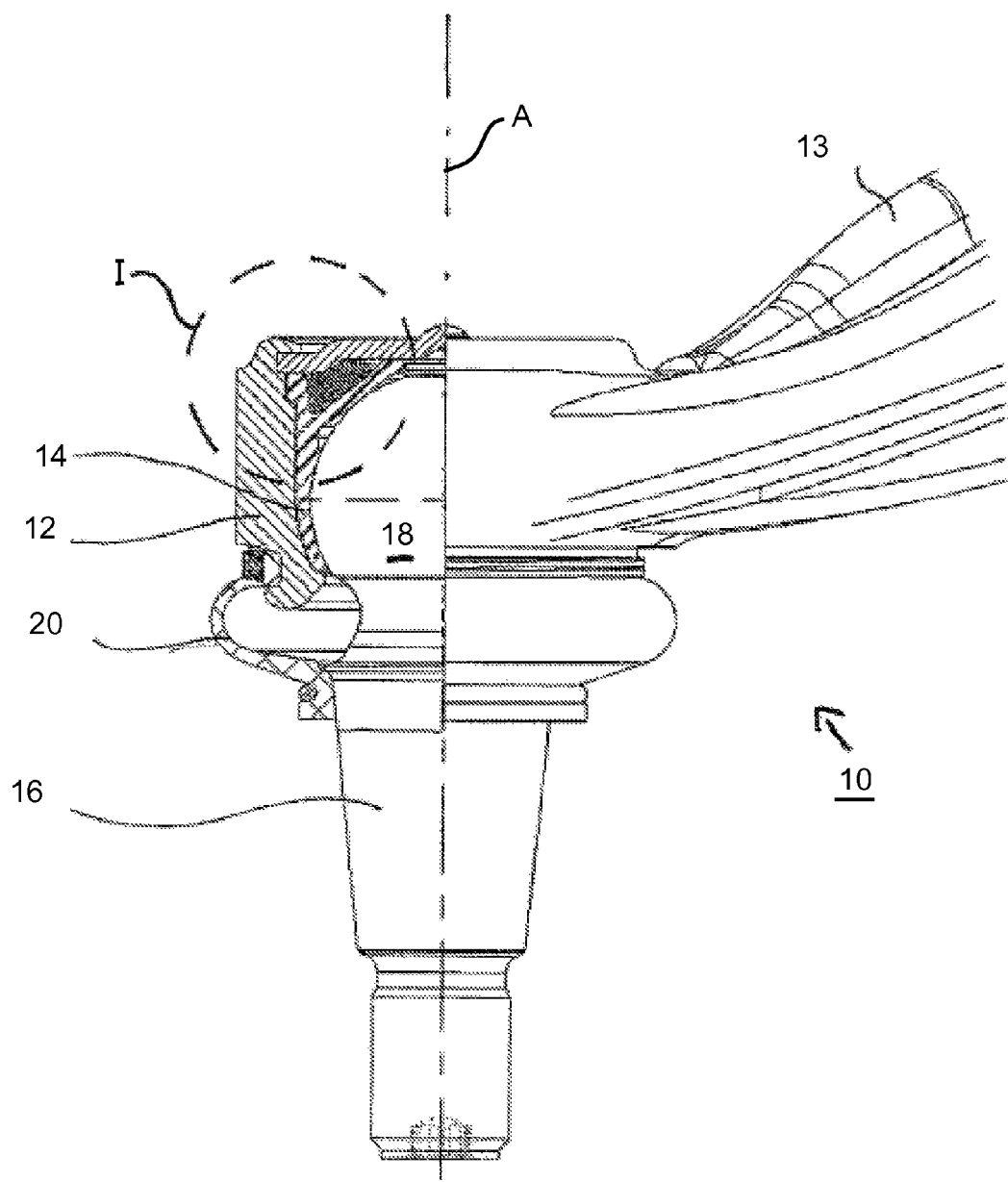
FIG. 1 is a longitudinal section through a ball joint according to the invention in a fully assembled state.

FIG. 1 shows a longitudinal section through a ball joint 10 according to the invention in a fully assembled state. The ball joint 10 comprises a joint housing 12 which is formed at one end of a suspension link 13 or similar. A bearing shell 14 is received in the joint housing 12. The ball joint 10 further comprises a ball stud 16 having a ball head 18, the ball head 18 being arranged for pivoting movement in the bearing shell 14. One end of a sealing bellows 20 is fastened to the joint housing 12, the opposite end of the sealing bellows 20 being in contact with the ball stud 16. This sealing bellows 20 seals the joint housing 12 in a known manner from the outside and prevents both the leakage of bearing grease and also the entry of dirt particles, water or similar.

Figure 2:
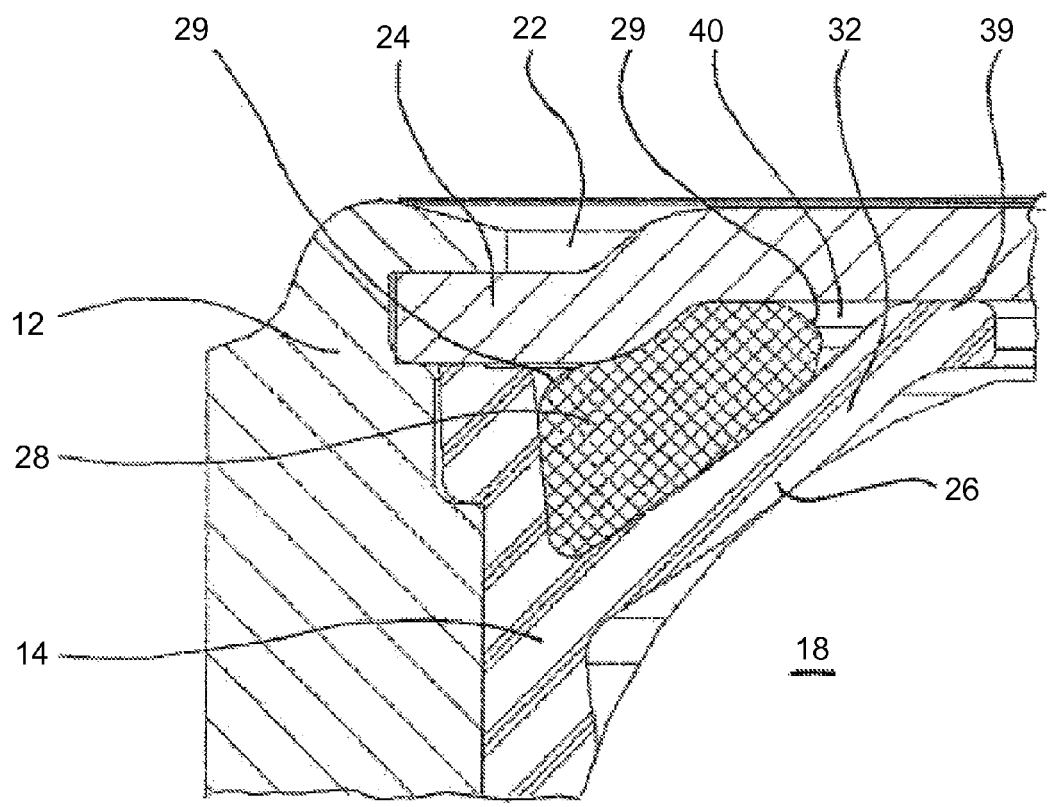
FIG. 2 is an enlarged view of the area I of FIG. 1.

FIG. 2 shows the area I of FIG. 1 in an enlarged view. The ball joint shown in FIG. 1 is configured in the form of a radial ball joint, the joint housing 12 having a mounting opening 22. In the assembled state of the ball joint 10, the mounting opening 22 is closed by a closure element in the form of a housing cover 24. To fasten the housing cover 24, an edge region of the joint housing 12 is flanged inwardly so that the housing cover 24 is fastened in a form-fitting manner to the joint housing 12. A spring element in the form of an elastic molded ring 28 is received between the housing cover 24 and a pole region 26 of the bearing shell 14. The molded ring 28 is preferably made of an elastomer material. FIG. 2 illustrates that in the assembled state of the ball joint 10, the molded ring 28 contacts both the housing cover 24 and the pole region 26 of the bearing shell 14. Details concerning the bearing shell 14 and the mounting thereof in the joint housing 12 in connection with the molded ring 28 are explained below with reference to FIGS. 3 to 7.

Figure 3:
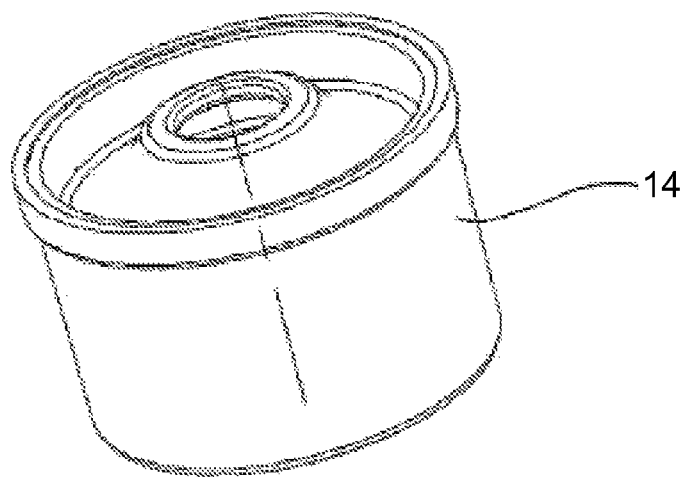
FIG. 3 is a perspective view of a bearing shell for use in a ball joint of FIG. 1.
Figure 4:
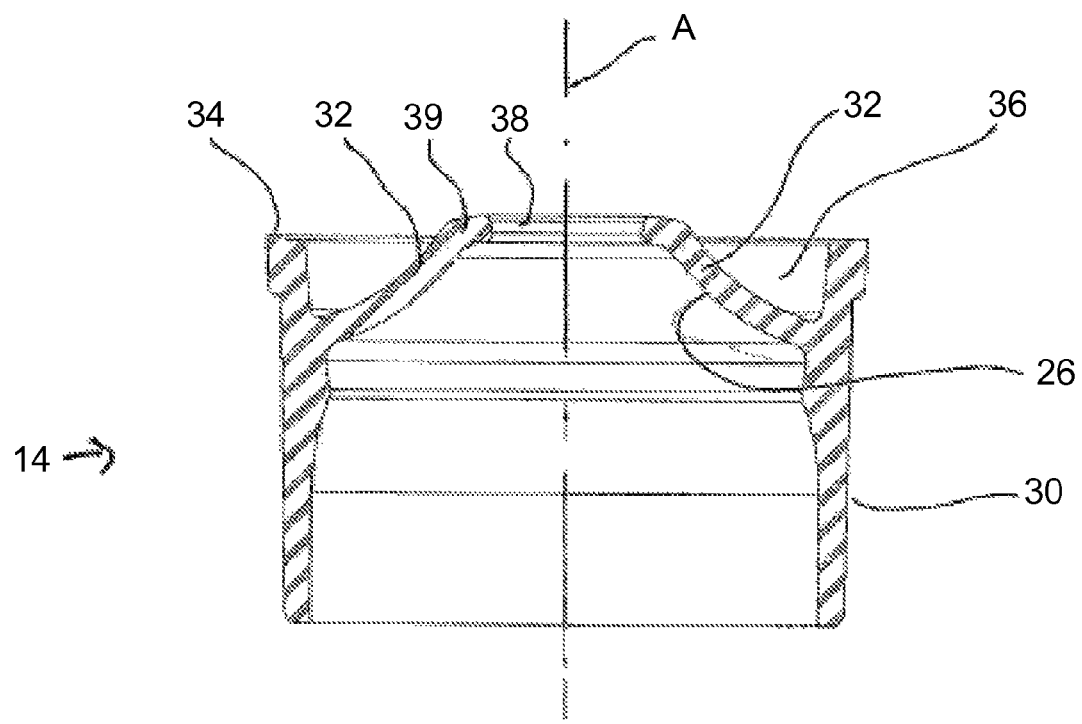
FIG. 4 is a cross-sectional view through the bearing shell of FIG. 3.

FIG. 3 shows the bearing shell 14 in a perspective view, FIG. 4 showing a cross-sectional view through the bearing shell 14. The bearing shell 14 is preferably made of an elastic polymer material. The bearing shell 14 comprises a cylindrical lateral wall 30 which is open in the bottom region shown in FIG. 4. In an upper region of the bearing shell 14, the lateral wall 30 merges into the pole region 26 which is formed by an end wall 32. The bearing shell 14 has an edge-side shoulder section 34 adjacent to the pole region 26. The end wall 32 has a centre opening 38 the upper edge 39 of which is axially further outside than the edge-side shoulder section 34 with respect to a longitudinal axis A of the bearing shell 14. The edge of the opening 38 thus forms in the assembled state of the ball joint 10 a ring-shaped cover contacting face with the housing cover 24 (see FIG. 2).

FIG. 4 illustrates that a recess 36 is formed between the shoulder section 34 and the end wall 32. The elastic molded ring 28 can be placed in this recess. In the unloaded state, the end wall 32 is configured in a concave manner as viewed from the outside, so that its curvature extends opposite to the surface of the ball head 18. In the assembled state of the ball joint 10, the end wall 32 takes the function of a spring element acting on the ball head 18, which is explained in detail below.

The molded ring 28 is in particular made of an elastomer material. The molded ring 28 may for example be made as a separate part which is placed in the recess 36 upon mounting of the ball joint. Alternatively, the molded ring 28 may also directly be formed integrally with the bearing shell 14. Such a one-piece configuration of the bearing shell 14 can be manufactured by a two-component injection molding, for example, the bearing shell preferably consisting of a polymer material and the molded ring of an elastomer material.

Figure 5:
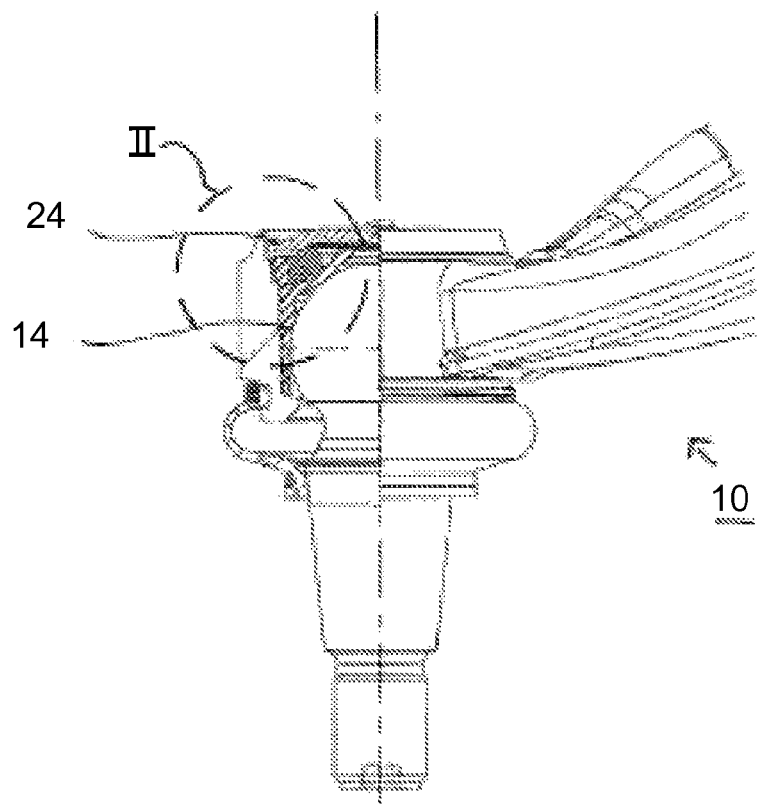
FIG. 5 is a longitudinal section through a ball joint according to the invention in a preassembled state, when a housing cover is placed on but not yet fastened to the housing.
Figure 6:
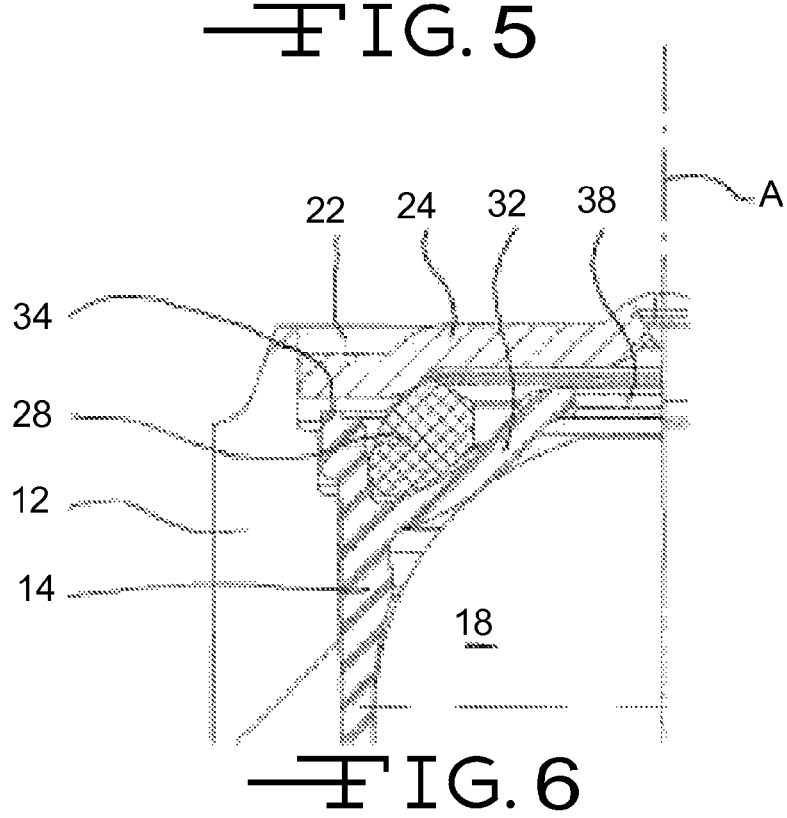
FIG. 6 is an enlarged view of the area II of FIG. 5.

FIGS. 5 and 6 show the ball joint 10 in a partly assembled state, the housing cover 24 being placed in the mounting opening 22, being however not yet fastened therein. FIG. 5 shows in detail a longitudinal section through the ball joint 10 of FIG. 1 in the partly assembled state, and FIG. 6 shows the area II of FIG. 5 in an enlarged view. Prior or during the assembling of the bearing shell 14 in the joint housing 12, the elastic molded ring 28 is inserted into the recess 36 of the bearing shell 14. When the bearing shell 14 is received in the joint housing 12, its longitudinal axis A coincides with that of the ball stud 16.

Figure 7:
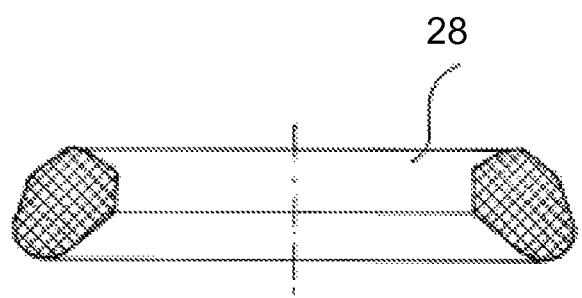
FIG. 7 is a cross-sectional view of an elastic molded ring for use in the ball joint of FIG. 1.

FIG. 7 shows the molded ring 28 in a cross-sectional view. The molded ring 28 is adapted by means of its cross-section to the shape of the recess 36 or to a cavity 40 formed between the pole region 26 of the bearing shell 14 and the housing cover 24. This particularly applies to the case in which the molded ring 28 is made of an elastomer material.

To close the ball joint 10, the housing cover 24 is at first pressed axially in a downward direction until it comes into contact with the edge-side shoulder section 34 of the bearing shell 14. The ring-shaped cover contact face of the centre opening 38 of the bearing shell 14 also comes into contact with the housing cover 24. As a result, the end wall 32 is subject to a bending stress and thus prestresses the ball head 18 substantially in the direction of the longitudinal axis A of the ball stud 16 against the joint housing 12. Additionally, the elastic molded ring 28 is compressed or pressed together. Consequently, the molded ring 28 fills a majority of the recess 36 or the cavity 40 between the pole region 26 of the bearing shell 14 and the housing cover 24 (see FIG. 2). The housing cover 24 is fastened appropriately in the mounting opening 22 by flanging an edge region of the joint housing 12 inwardly.

In the following, it is explained according to which principle the ball head 18 is prestressed by a spring system substantially in the direction of a longitudinal axis of the ball stud 16 against the joint housing 12.

Figure 8:
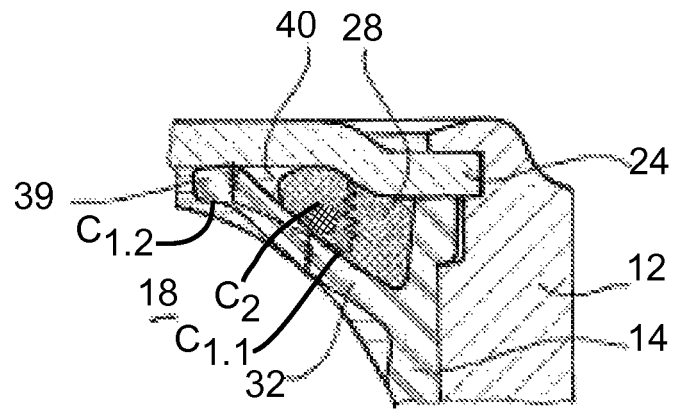
FIG. 8 is a detail of the ball joint of FIG. 1 by analogy with the enlarged view of FIG. 2, spring elements being in principle shown therein for a better understanding.
Figure 9:
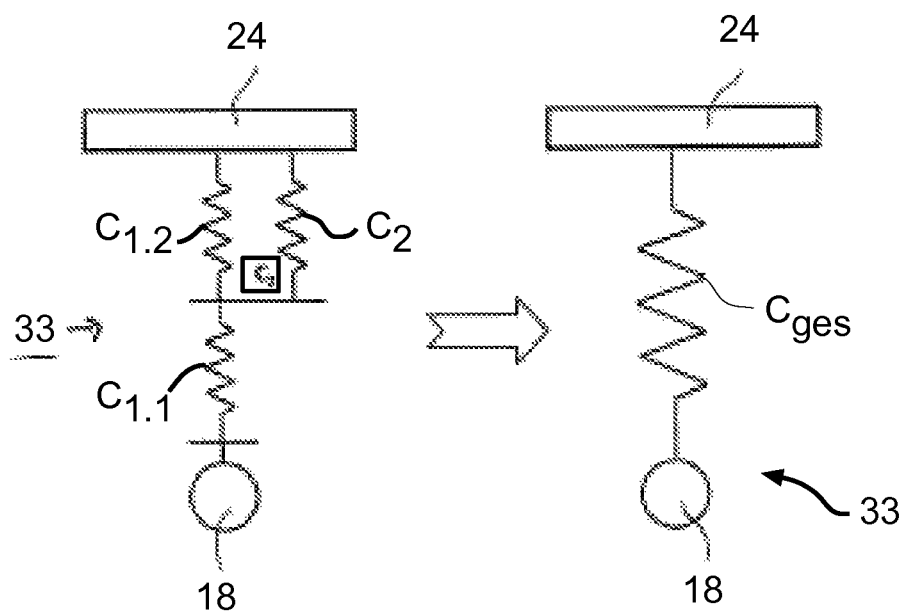
FIG. 9 is a spring spare circuit diagram for the representation of the ball joint of FIG. 8, FIGS. 10a-c are different possible spring characteristics for the ball joint according to the invention.

In the fully assembled state of the ball joint 10, the end wall 32 of the bearing shell 14 and the elastic molded ring 28 take the function of spring elements by means of which a force is exerted on the ball head 18 to prestress the latter substantially in the direction of the longitudinal axis A of the ball stud 16. The molded ring 28 and the end wall 32 together form a spring system 33. FIG. 8 shows a detail of the fully assembled ball joint 10, wherein for the end wall 32 and the molded ring 28 the associated spring constants are in principle marked, and FIG. 9 showing a corresponding spring spare circuit diagram. The spring constant $c_{1,1}$ of a spring element adjacent to the ball head 18 refers to a centre region of the end wall 32, the spring constant $c_2$ referring to the elastic molded ring 28. Furthermore, the spring constant $c_{1,2}$ refers to the upper edge 39 of the end wall 32, wherein the end wall 32 as a whole is to be understood as a series connection of the spring constants $c_{1,1}$ and $c_{1,2}$.

The pole region 26 of the bearing shell 14 is subject to a bending stress via its end wall 32, as the upper edge 39 of the centre opening 38 is in contact with the housing cover 24

(FIG. 8). The end wall 32 is in direct contact with the ball head 18 and exerts a force thereon, amongst others an axially downward force. The elastic molded ring 28 is received in the cavity 40 between the housing cover 24 and the pole region 26, it is however not in direct contact with the ball head 18. As a result, the center region of the end wall 32 adjoined by the molded ring 28 and the molded ring 28 form a series connection of spring elements (having the spring constants $c_{1,1}$ or $c_2$). The upper edge 39 of the end wall 32, represented as spring constant $c_{1,2}$, is to be understood as being connected in parallel with the molded ring 28 (spring constant $c_2$).

As a result, the end wall 32 and the molded ring 28 act on the ball head 18 in the manner of a spring system in which the involved spring elements are connected both in parallel and in series, as explained above. The spring spare circuit diagram of FIG. 9 illustrates again the spring system 33 or the just mentioned connection between the end wall 32 and the molded ring 28. Due to this connection which represents an overlapping of a parallel and series connection, it is possible to precisely adjust an overall rate of this spring system pursuant to the mechanical laws according to which the respective spring constants of the involved spring elements contribute to an overall spring characteristic $c_{ges}$ of the spring system 33. Furthermore, the choice of the materials, for example a polymer plastic material for the bearing shell 14 and an elastomer plastic material for the molded ring 28, permits a precise adjustment of the overall spring characteristic $c_{ges}$, also in case of an axial loading of the ball joint.

The ball head 18 is prestressed by the spring system 33 against the joint housing 12 in the axial direction, i.e. substantially in the direction of the longitudinal axis A of the ball stud 16. In this way, a wear of the ball joint 10, for example in the form of settling effects, a free play or similar, can effectively be counteracted. It is thus possible to ensure required characteristic values of the ball joint 10 also over the lifetime thereof.

Figure 10A:
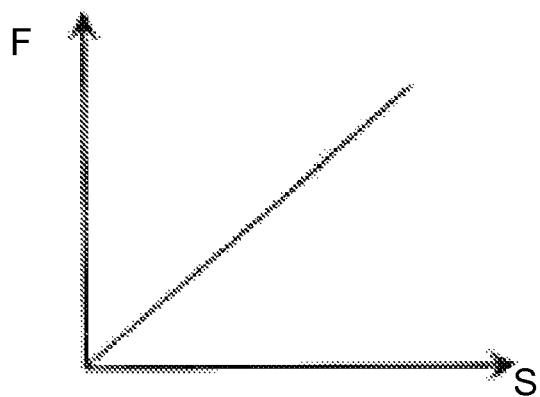
Figure 10B:
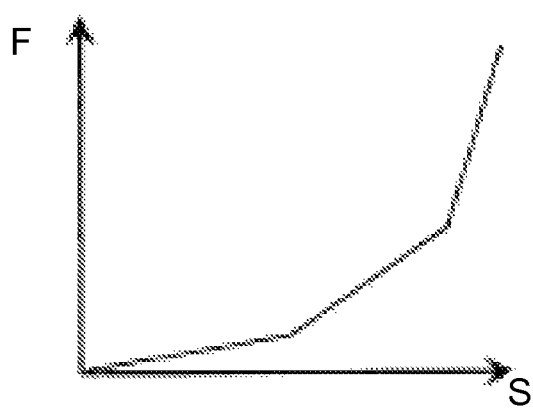
Figure 10C:
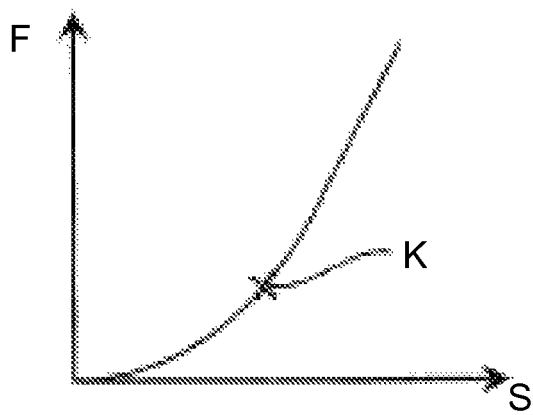

Depending on the material properties of the spring elements involved in the spring system 33 and the manner how the spring elements are connected with each other, the resulting overall spring characteristic $c_{ges}$ can take a linear, multilinear or a nonlinear shape. This is in principle illustrated in the force-travel characteristics according to FIGS. 10a, 10b and 10c, respectively. Regarding the embodiment explained above, in which the elastic molded ring 28 is made of an elastomer, it must be understood that in this respect, the characteristic according to FIG. 10c is realized.

Figure 11:
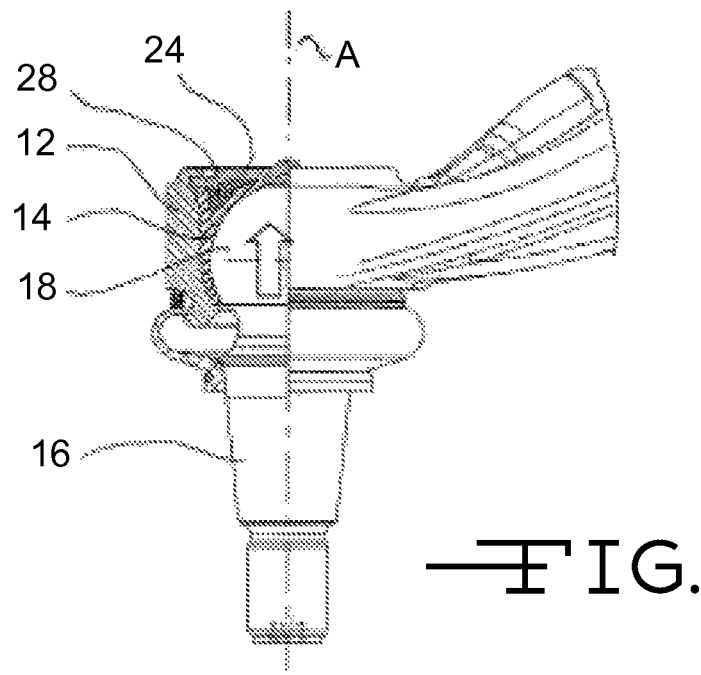
FIG. 11 is a longitudinal section through the ball joint according to the invention of FIG. 1 when an axial loading condition arises.
Figure 12:
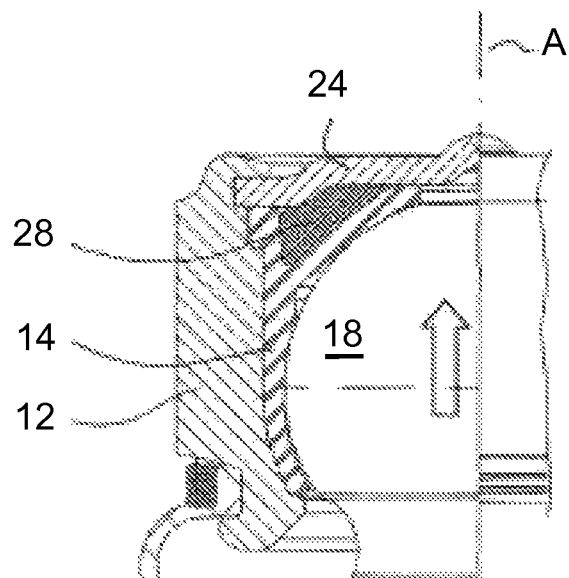
FIG. 12 is an enlarged view of the left-hand area of FIG. 1.

FIGS. 11 and 12 show the ball joint 10 in case of a loading in the axial direction, i.e. in the direction of the longitudinal axis A. In detail, FIG. 11 illustrates a longitudinal section through the ball joint 10, in accordance with FIG. 1. FIG. 12 shows a left-hand area of FIG. 11 in an enlarged view. The axial loading on the ball joint 10 in the direction of the longitudinal A is marked by a respective arrow in FIGS. 11 and 12. A comparison of FIG. 2 with FIG. 12 points up that in a loading condition, the cavity between the housing cover 24 and the pole region 26 is now not only mostly but substantially entirely filled by the elastic molded ring 28. As soon as this is the case in a loading condition, the slope of the characteristic (see FIG. 10c) rises in a progressive manner so that the rigidity of the spring systems 33 is increased. In the diagram according to FIG. 10c, the point from which the molded ring 28 substantially entirely fills the cavity 40 in a loading condition is denoted by "K".

In addition to its function as additional spring element, the molded ring 28 ensures an operational reliability of the ball joint 10, in particular in case of high axial loads, by preventing the end wall 32 from kinking into the cavity 40. The ball joint 10 is thus configured in a fail-proof manner and is protected against breakdown also in case of high axial loads.

The cross-section of the elastic molded ring 28 is suitably chosen such that in the assembled state of the ball joint 10, edge regions of the molded ring 28 are spaced apart from body joints formed between the bearing shell 14 and the housing cover 24 or an inner wall of the joint housing 12. In FIG. 2 it can be seen that the cross-section of the molded ring 28 has suitable roundings 29 adjoining such body joints so that the molded ring 28 does not come into contact with this body joints. As a result, in the assembled state of the ball joint 10, a damage of the molded ring 28 is avoided and thus the lifetime thereof increased.

Figure 13:
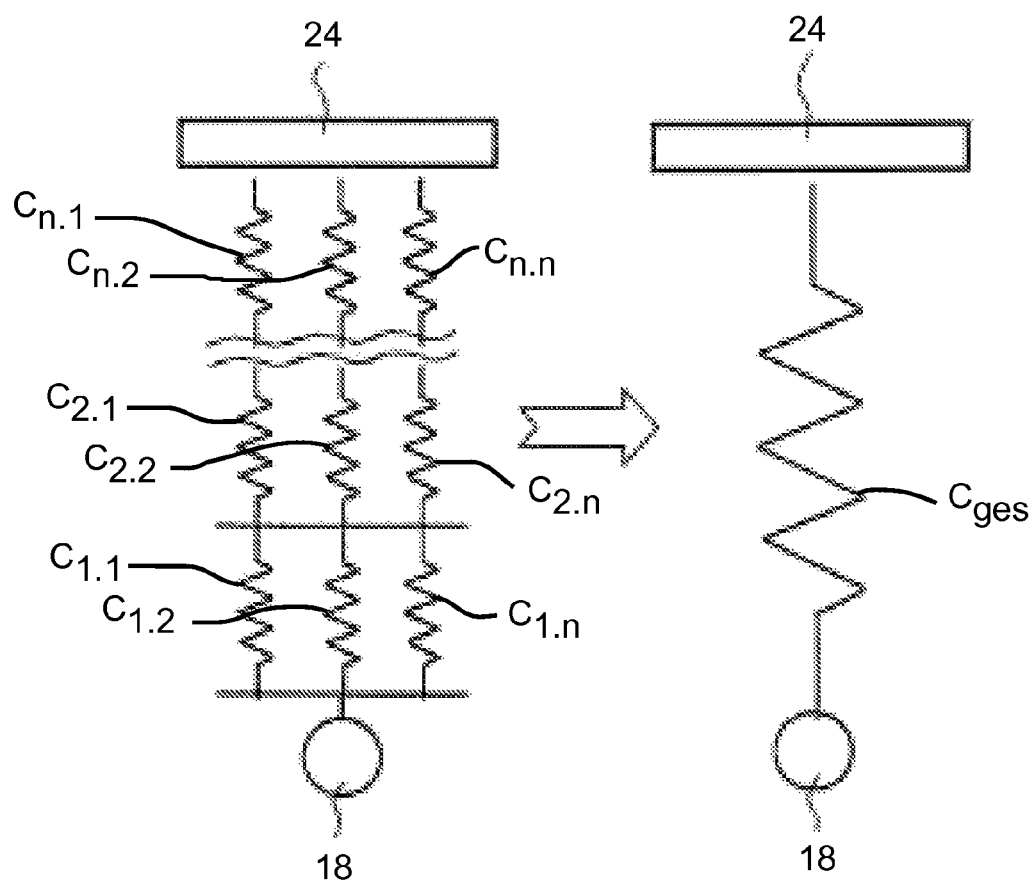
FIG. 13 is a general spring spare circuit diagram for different possible embodiments of the ball joint according to the invention.

Regarding a spring system by means of which the ball head 18 is axially prestressed, it must be understood that the latter may generally be composed of a plurality of spring elements which are connected in parallel and/or in series with each other. This is illustrated in the spring spare circuit diagram according to FIG. 13. Here, reference number "18" denotes the ball head, and reference number "24" denotes the housing cover 24 or an inner face of the joint housing 12. The mentioned plurality of spring elements can be arranged between the ball head 18 and the housing cover 24 (or an inner face of the housing 12, respectively). In detail, spring elements may be provided adjacent to the ball head, which are connected in parallel with their spring constants $c_{1,1}$, $c_{1,2}$, $c_{1,n}$ etc. This can be adjoined by a group of spring elements which are each connected in parallel with each other with their spring constants $c_{2,1}$, $c_{2,2}$, $c_{2,n}$ etc., which are however connected in series with respect to the spring elements having the spring constants $c_{1,1}$, $c_{1,2}$, $c_{1,n}$. The same applies to the spring elements having the spring constants $c_{n,1}$, $c_{2,n}$, $c_{n,n}$ etc., in case they are present. The spring spare circuit diagram according to FIG. 13 illustrates in its right-hand part of the figure that this group of spring elements all in all fit together to form an overall spring characteristic $c_{ges}$ by means of which the ball head 18 is prestressed with respect to the housing 12.

In FIGS. 14-24, further embodiments for the ball joint 10 are explained below. These alternative embodiments differ from each other in the configuration of the bearing shell 14 and the structure of the spring system by means of which the ball head 18 is axially prestressed. As far as the ball joint according to these alternative embodiments has identical features in comparison with the embodiment of FIG. 1, the same reference numbers are also used to this.

Figure 15:
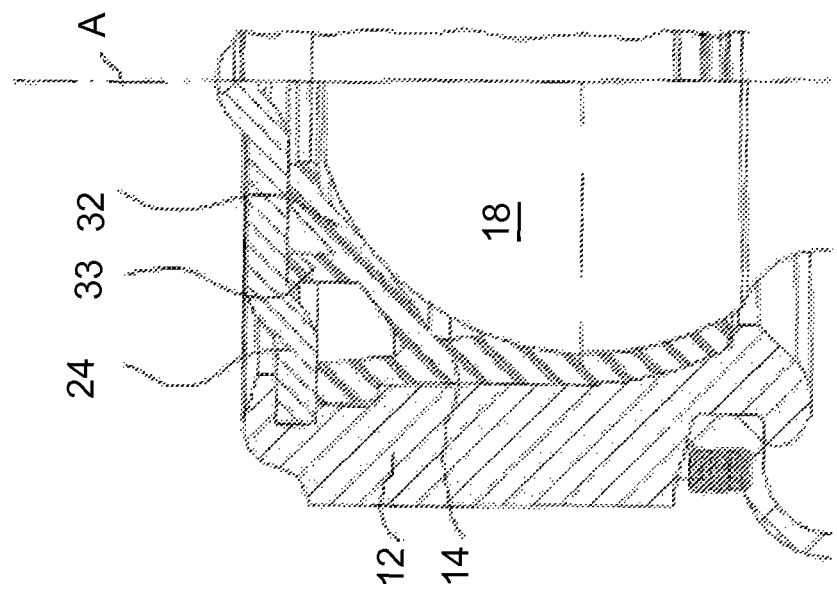
FIG. 15 is an enlarged view of the left-hand area of FIG. 14.
Figure 14:
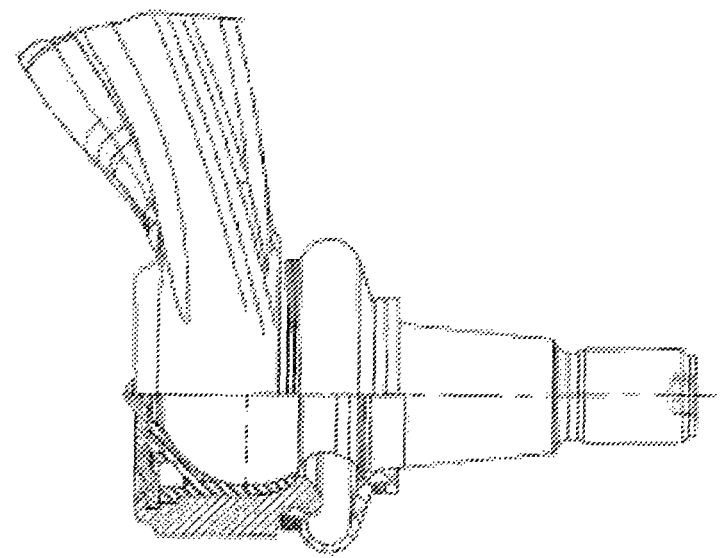
FIG. 14 is a longitudinal section through a ball joint according to the invention in a fully assembled state according to a further embodiment.

FIG. 14 shows a further embodiment for the ball joint 10, FIG. 15 illustrating the left-hand area of FIG. 14 in an enlarged manner. FIG. 14 and FIG. 15, respectively, show the ball joint 10 in the fully assembled state. In this embodiment, a web 33 extending substantially parallel to the longitudinal axis A is integrally formed with an upper side of the pole region 26, i.e. in an approximately centre region of the end wall 32. The web 33 suitably consists of the same material as the bearing shell 14 itself so that the latter can for example be manufactured by injection molding without any considerable postprocessing. The upper free end of the web 33 is in contact with the housing cover 24 and thus forms a connection between the housing cover 24 and the end wall 32. With respect to the spring spare circuit diagram of FIG. 9, the web 33 is to be understood as spring constant $c_2$ so that it forms along with the center region of the end wall 32 (spring constant $c_{1,1}$) a series connection of springs. Regarding the embodiment according to FIGS. 14 and 15, it must be understood that no elastic molded ring 28 is used here as the latter is substituted with the web 33. The overall spring characteristic of this embodiment has a comparatively high rigidity as the web 33 is only slightly deformable or compressible in its longitudinal direction. Irrespective thereof, the spring system which is composed of the end wall 32 and the web 33 in this embodiment, is subject to the same operating principle as explained above as to FIG. 9, so that reference is made thereto to avoid repetitions.

Figure 17:
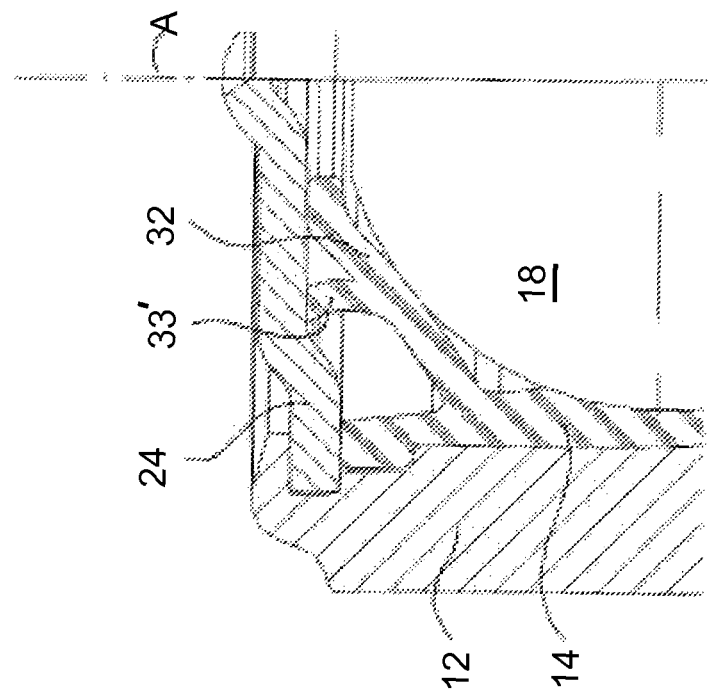
FIG. 17 is an enlarged view of the left-hand area of FIG. 16.
Figure 16:
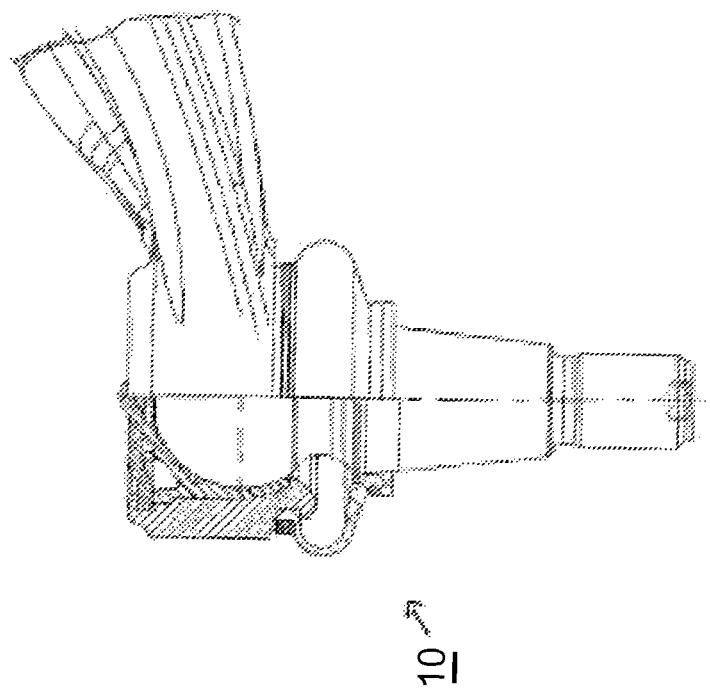
FIG. 16 is a longitudinal section through a ball joint according to the invention in a fully assembled state according to a further embodiment.

FIGS. 16 and 17 show a further variant for the ball joint 10. FIG. 16 shows a longitudinal section through this ball joint, FIG. 17 showing the left-hand area of FIG. 16 in an enlarged view. This variant substantially corresponds to the embodiment according to FIG. 14. The only difference is that the web 33' which is integrally formed with the end wall 32 is now configured in a curved manner, rather than as a linear projection. Due to this curvature, the overall spring characteristic is all in all "softer", as the web 33' can be deformed more easily in the axial direction, i.e. parallel to the longitudinal axis A when the ball joint 10 is loaded in this direction.

Figure 19:
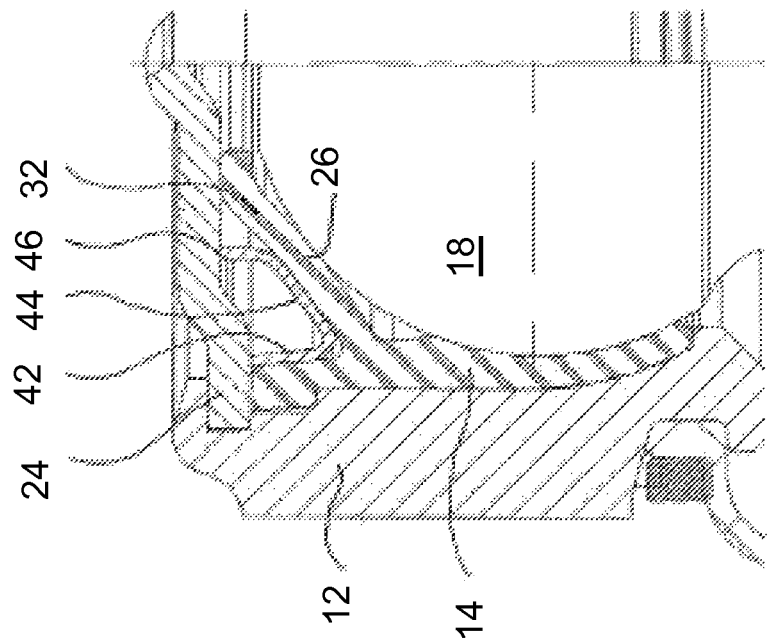
FIG. 19 is an enlarged view of the left-hand area of FIG. 18.
Figure 18:
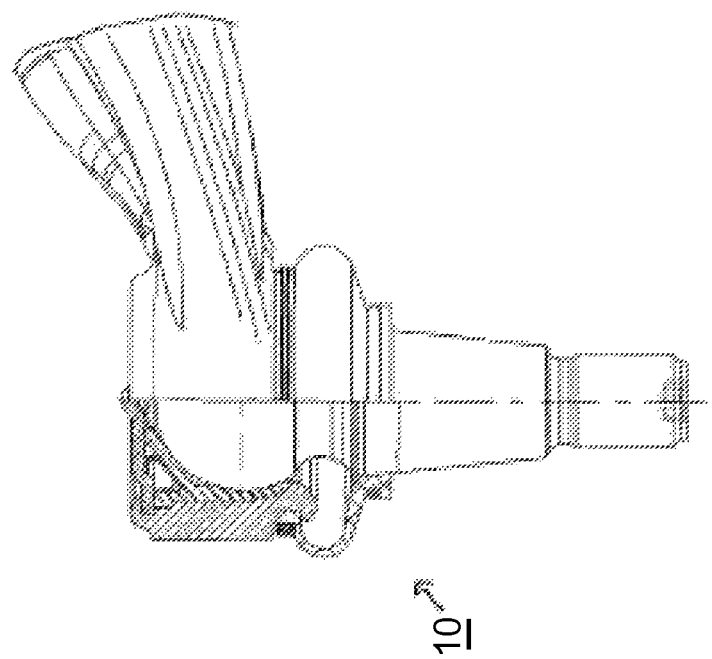
FIG. 18 is a longitudinal section through a ball joint according to the invention in a fully assembled state according to a further embodiment.

FIGS. 18 and 19 illustrate a further embodiment for the ball joint 10, FIG. 18 showing a longitudinal section through this joint, and FIG. 19 showing the left-hand area of FIG. 18 in an enlarged view. In this embodiment, the configuration of the ball shell corresponds to that of FIG. 1. However, in contrast thereto, a metal ring 42 is inserted in the recess 36, rather than a molded ring 28. The metal ring 42 has a U-shaped cross-section having a bottom region 44 and an upper edge 46. In the assembled state of the ball joint 10 (see FIG. 19), the bottom region 44 rests within the recess 36 on a surface of the pole region 26, the legs of the upper edge 46 being in contact with the housing cover 24. In its mode of operation as a spring element, the metal ring 42 corresponds to the elastic molded ring 28 (FIG. 2) or to the web 33 (FIG. 15), reference being made to the above explanation at the corresponding passage in order to avoid repetitions. The metal ring 42 thus forms along with the end wall 32 a spring system the rigidity of which is comparatively high due to the metal ring 42.

Figure 20:
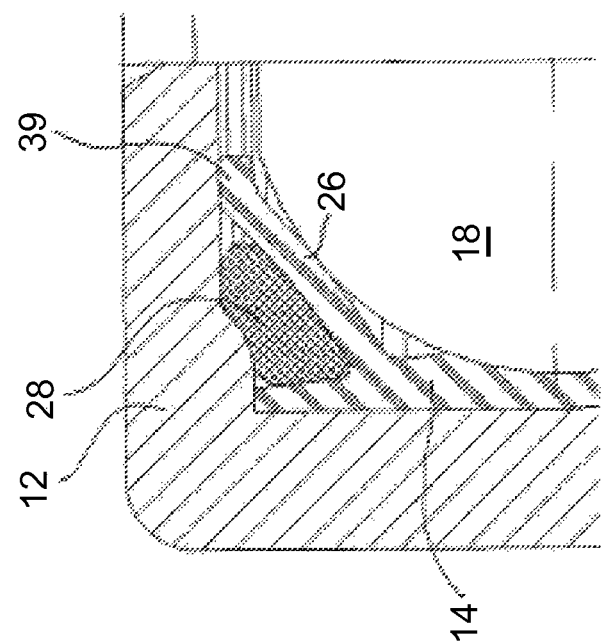
FIG. 20 is a longitudinal section through a ball joint according to the invention in a fully assembled state according to a further embodiment.
Figure 21:
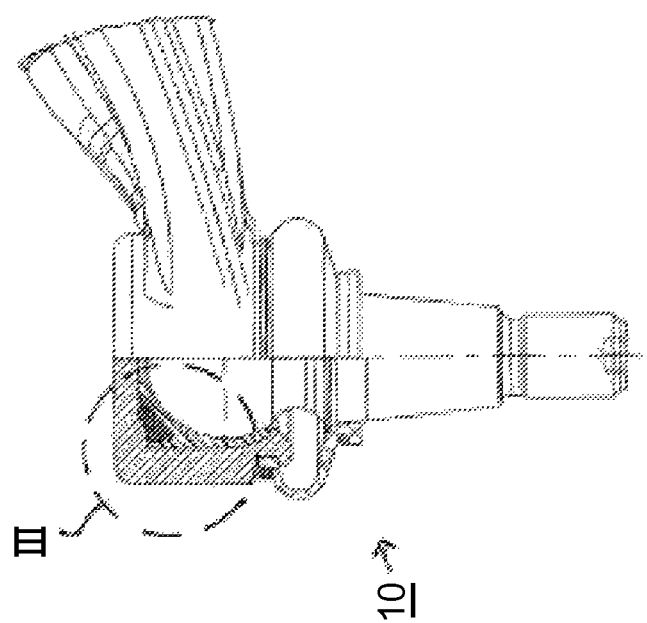
FIG. 21 is an enlarged view of the area III of FIG. 20.
Figure 22:
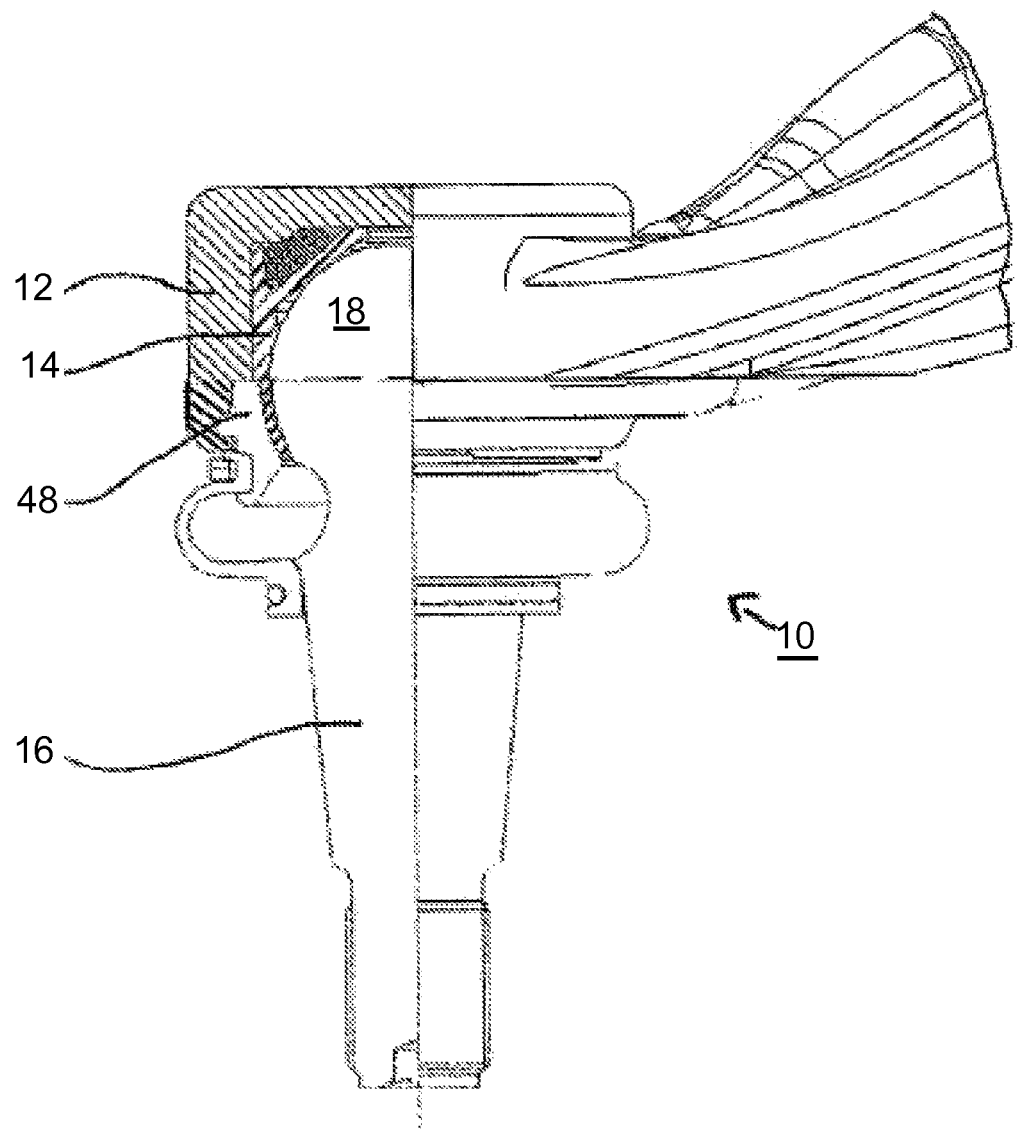
FIG. 22 is a longitudinal section through the ball joint according to the invention of FIG. 20 in a fully assembled state and in a modified embodiment.

FIGS. 20-22 show a further variant of the ball joint 10, FIG. 20 showing a longitudinal section through this joint, and FIG. 21 showing the area III in an enlarged view. Regarding the operating principle of the spring system 33 which is composed of the end wall 32 and of the elastic molded ring 28, this embodiment corresponds entirely to the ball joint of FIG. 1. The difference with respect to the joint of FIG. 1 consists in that in this embodiment (FIG. 21), the joint housing 12 is configured so as to be completely closed in its upper region. Accordingly, no housing cover 24 is provided. The upper edge 39 and the molded ring 28 thus are in contact with an inner face of the joint housing 12 in the assembled state of the joint. With regard to mounting ability of this embodiment, it must be understood that both the bearing shell 14 and the ball head 18 are inserted from a bottom face into the joint housing 12, the joint being then closed by means of a forming bell and a bellows groove being turned. Alternatively to FIG. 20, FIG. 22 shows a modification of this embodiment in which a closure ring 48 is fastened in a bottom region of the joint housing 12. This closure ring 48 is suitably fastened to the joint housing 12 after the insertion of the bearing shell 14 and of the ball head 18 (for example by screwing) in order to captively hold the bearing shell 14 in the joint housing 12.

Figure 24:
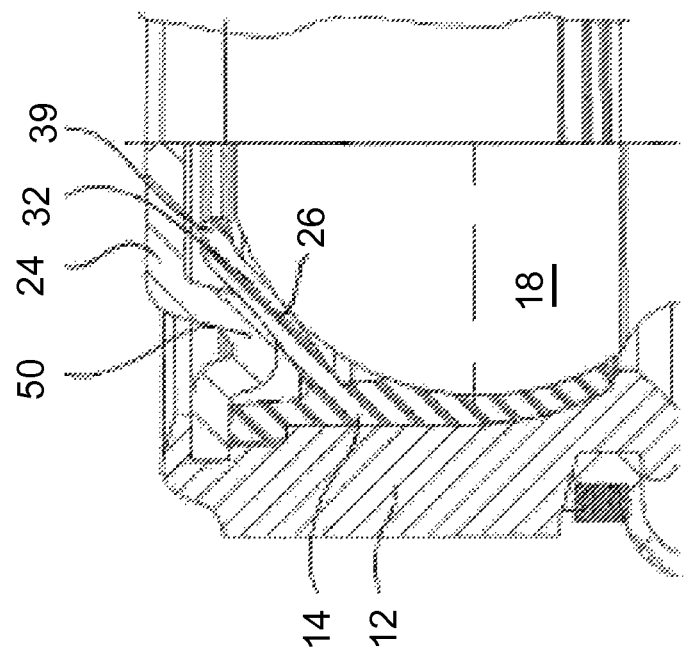
FIG. 24 is an enlarged view of the left-hand area of FIG. 23.
Figure 23:
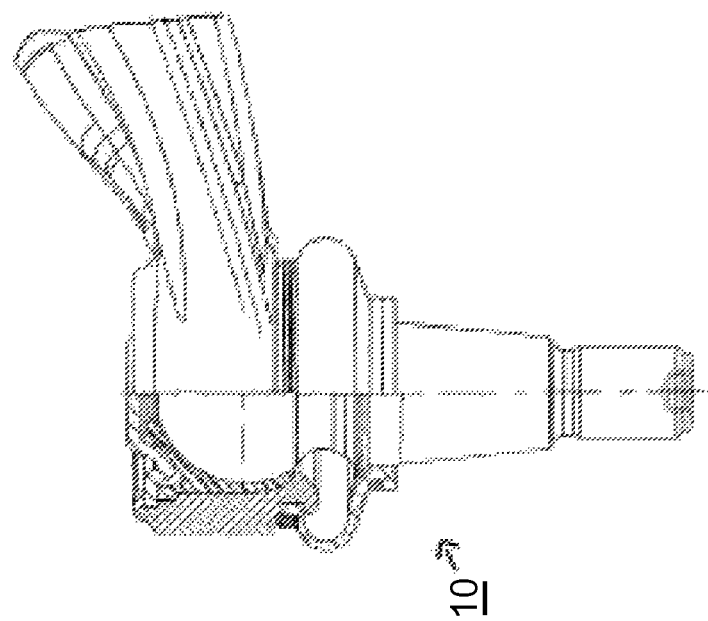
FIG. 23 is a longitudinal section through a ball joint according to the invention in a fully assembled state in a further embodiment.
Figure 25:
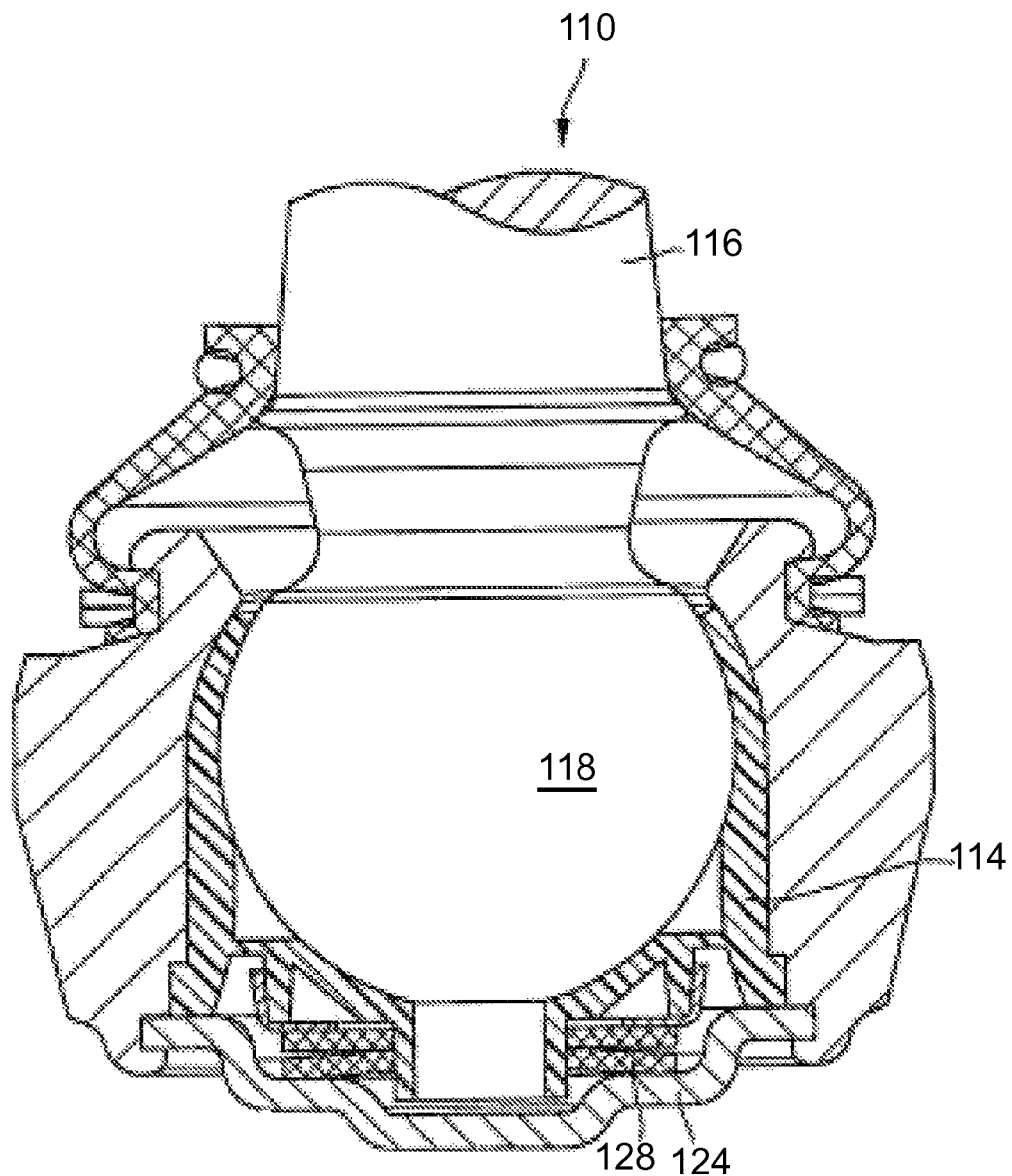
FIG. 25 is a longitudinal section through a ball joint according to the prior art.

FIGS. 23 and 24 show a further embodiment of the ball joint 10, FIG. 23 showing a longitudinal section through this joint, and FIG. 24 showing the left-hand area of FIG. 23 in an enlarged view. In this embodiment, the housing cover 24 has an axially inwardly directed ring-shaped bead 50. In the assembled state of the joint (FIG. 24), this bead 50 contacts the pole region 26 of the ball shell 14 or the end wall 32 thereof. In the same manner as in the embodiment of FIG. 1, the housing cover 24 is fastened in the joint housing 12 by flanging the upper outer edge region thereof inwardly. The housing cover 24 is preferably made of spring steel. The bead 50 takes the function of a spring element and corresponds with reference to the spring spare circuit diagram of FIG. 9 to the spring constant $c_2$. As long as the upper edge 39 does not contact the housing cover 24, the end wall 32 only corresponds to the spring constant $c_{1,1}$, because the spring constant $c_{1,2}$ is zero. Accordingly, the bead 50 and the end wall 32 form in the state shown in FIG. 24 a series connection of spring elements by means of which the ball head 18 is axially prestressed against the joint housing 12. If in case of an axial loading of the ball joint 10 the upper edge 39 comes into contact with the housing cover, a connection of the spring elements according to the principle of FIG. 9 is realized, as the upper edge 39 then corresponds to the spring constant $c_{1,2}$ and forms along with the bead 50 a parallel connection. As a result, the resulting spring rigidity of the spring system increases.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A ball joint comprising:
   a joint housing,
   a bearing shell received in the joint housing,
   a ball stud having a ball head arranged for pivoting movement in the bearing shell, the ball head being prestressed by a spring system substantially in the direction of a longitudinal axis of the ball stud against an inner bottom surface of the joint housing and/or a housing cover secured to the joint housing,
   wherein the spring system is composed of spring elements connected in parallel or both in parallel and in series and which when the spring elements are connected in parallel are configured to always be in direct contact with the inner bottom surface of the joint housing and/or the housing cover, at least one spring element of the spring system being made of a polymer material or of an elastomer material.

2. The ball joint according to claim 1, wherein the at least one spring element of the spring system is formed integrally with the bearing shell or is part of the bearing shell.

3. The ball joint according to claim 1, wherein a first spring element of the spring system is formed from a pole region of the bearing shell and is subject to a bending stress in the assembled state of the ball joint.

4. The ball joint according to claim 3, wherein the first spring element contacts the joint housing or the housing cover fastened in an opening of the joint housing in the assembled state of the ball joint or by an axial loading of the ball joint, such that a spring parallel connection with a further spring element which is in contact with the bearing shell results therefrom.

5. The ball joint according to claim 1, wherein a further spring element of the spring system contacts both the bearing shell and the housing or the housing cover which is fastened in an opening of the housing.

6. The ball joint according to claim 5, wherein the further spring element is configured in the form of a ring.

7. The ball joint according to claim 5, wherein the further spring element is manufactured separately from the bearing shell and is arranged on the bearing shell in the assembled state of the joint.

8. The ball joint according to claim 5, wherein the further spring element is formed integrally with the bearing shell.

9. The ball joint according to claim 8, wherein the further spring element is formed integrally with the bearing shell by two-component injection molding.

10. The ball joint according to claim 5, wherein the further spring element is made of an elastomer material.

11. The ball joint according to claim 10, wherein the further spring element is received in a cavity which is formed between the bearing shell on one side and the joint housing or the housing cover on the other side.

12. The ball joint according to claim 11, wherein the further spring element is adapted to the cavity by means of the cross-section thereof, the further spring element filling the cavity substantially entirely in case of an axial loading of the ball joint.

13. The ball joint according to claim 11, wherein the further spring element fills the majority of the cavity in the assembled state of the ball joint.

14. The ball joint according to claim 5, wherein the further spring element is made of metal.

15. A ball joint comprising:
a joint housing,
a bearing shell received in the joint housing,
a ball stud having a ball head arranged for pivoting movement in the bearing shell, the ball head being prestressed by a spring system substantially in the direction of a longitudinal axis of the ball stud against an inner bottom surface of the joint housing and/or a housing cover secured to the joint housing,
wherein the spring system is composed of spring elements connected in parallel or both in parallel and in series and which when the spring elements are connected in parallel are configured to have parallel oriented portions of the spring elements always in contact with the inner bottom surface of the joint housing and/or the housing cover whereby the deflection in the parallel direction of the spring elements connected in parallel is substantially the same, at least one spring element of the spring system being made of a polymer material or of an elastomer material.

16. The ball joint according to claim 15, wherein the at least one spring element of the spring system is formed integrally with the bearing shell or is part of the bearing shell.

17. The ball joint according to claim 15, wherein a first spring element of the spring system is formed from a pole region of the bearing shell and is subject to a bending stress in the assembled state of the ball joint.

18. The ball joint according to claim 17, wherein the first spring element contacts the joint housing or the housing cover fastened in an opening of the joint housing in the assembled state of the ball joint or by an axial loading of the ball joint, such that a spring parallel connection with a further spring element which is in contact with the bearing shell results therefrom.

19. The ball joint according to claim 15, wherein a further spring element of the spring system contacts both the bearing shell and the housing or the housing cover which is fastened in an opening of the housing.

* * * * *